May 9, 1939.  T. C. E ROWLAND ET AL  2,157,970
APPARATUS FOR DELIVERING LIQUIDS AND VISCOUS MATERIALS
Filed April 28, 1937   6 Sheets-Sheet 1
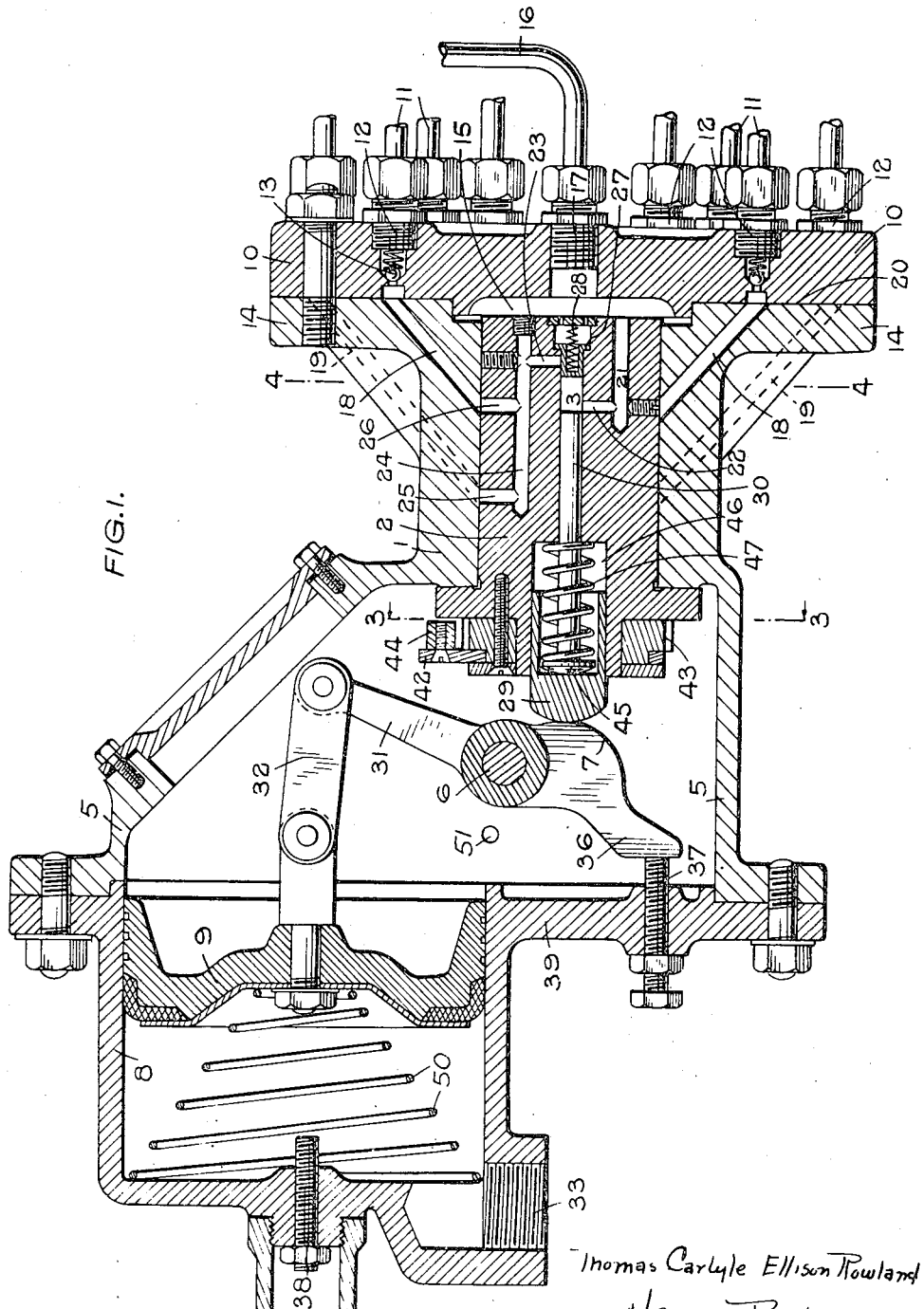

May 9, 1939.  T. C. E ROWLAND ET AL  2,157,970
APPARATUS FOR DELIVERING LIQUIDS AND VISCOUS MATERIALS
Filed April 28, 1937   6 Sheets—Sheet 2

Thomas Carlyle Ellison Rowland
Harry Parker  Applicants

Faulmin & Faulmin
Attorneys.

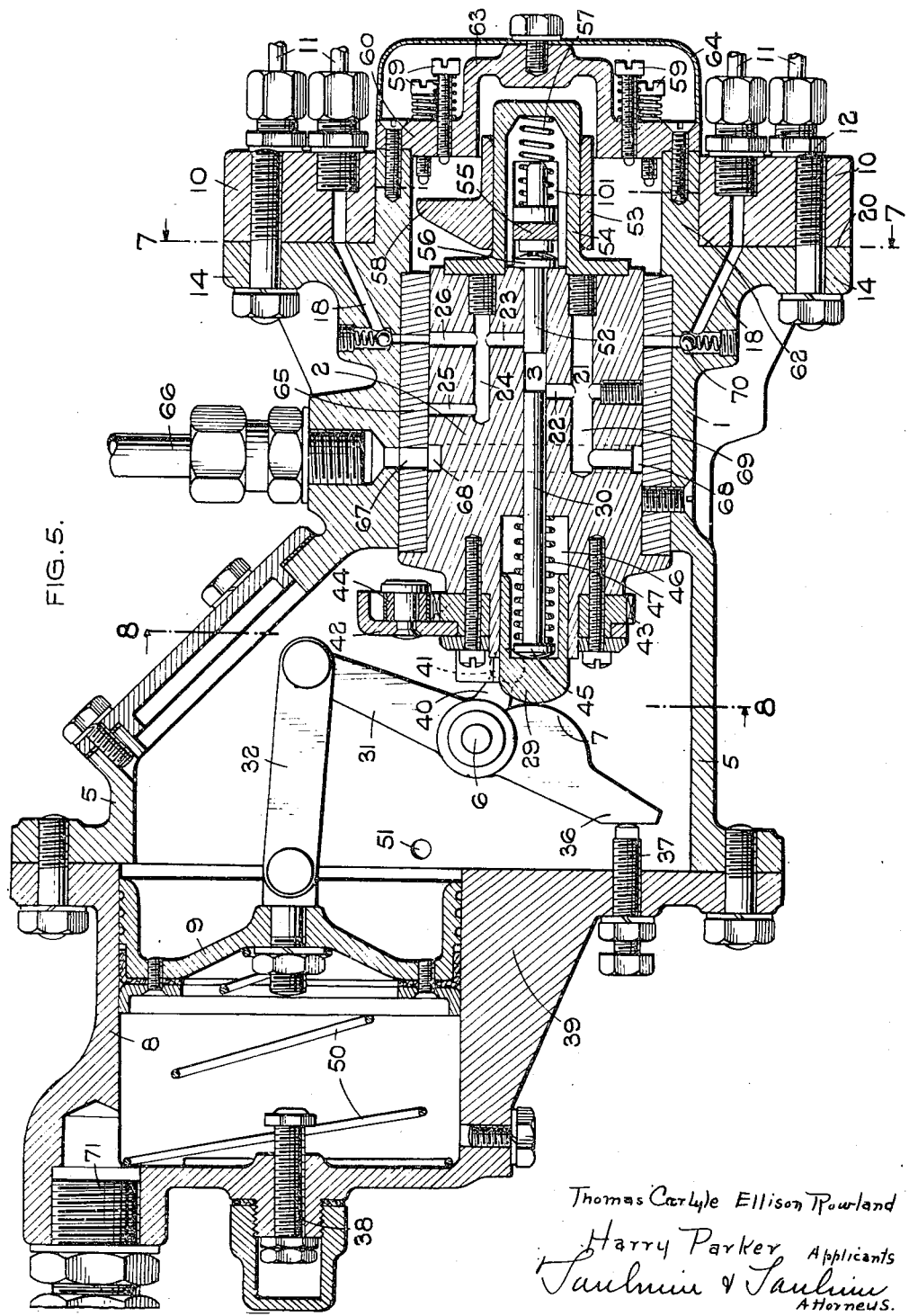

May 9, 1939.   T. C. E. ROWLAND ET AL   2,157,970
APPARATUS FOR DELIVERING LIQUIDS AND VISCOUS MATERIALS
Filed April 28, 1937   6 Sheets-Sheet 4
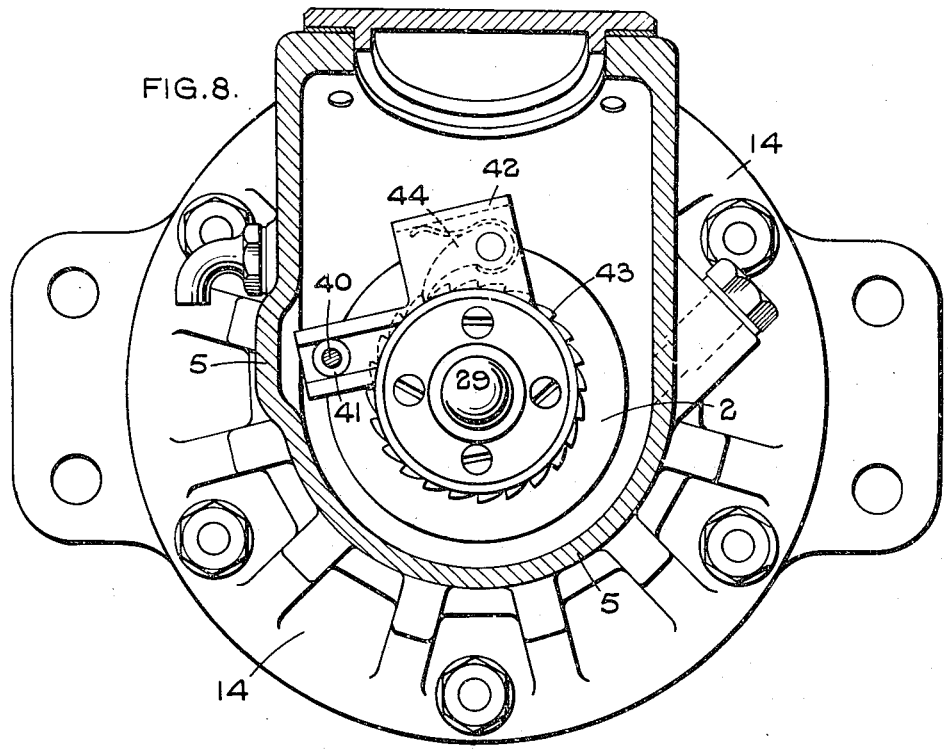
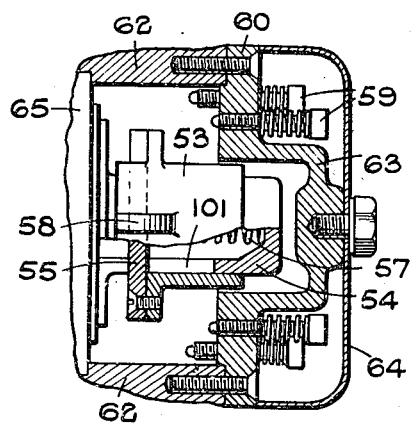
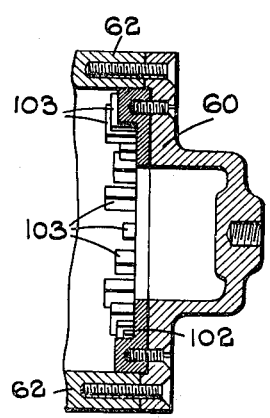
Thomas Carlyle Ellison Rowland
Harry Parker
Applicants
Saulnier & Saulnier
Attorneys

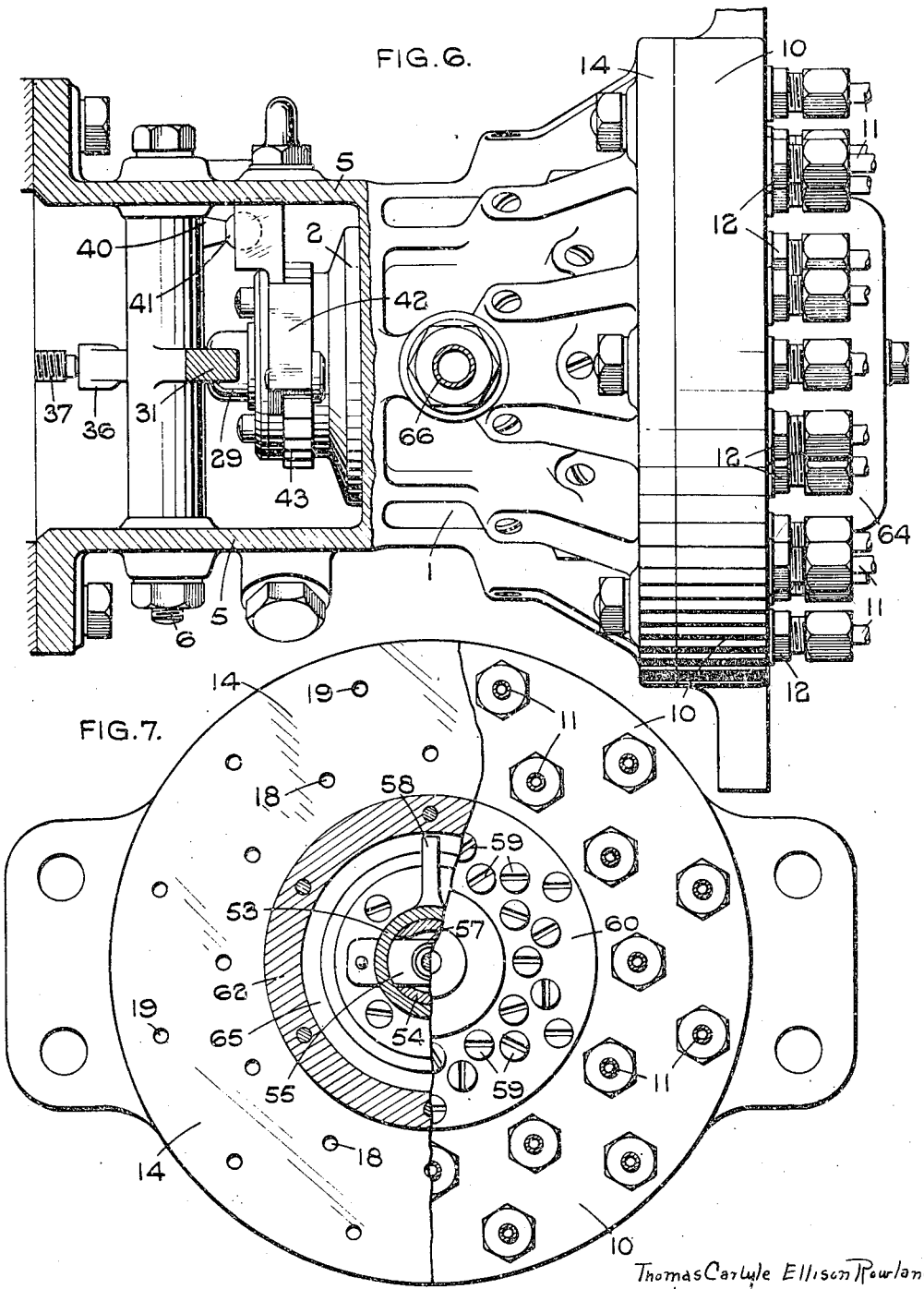

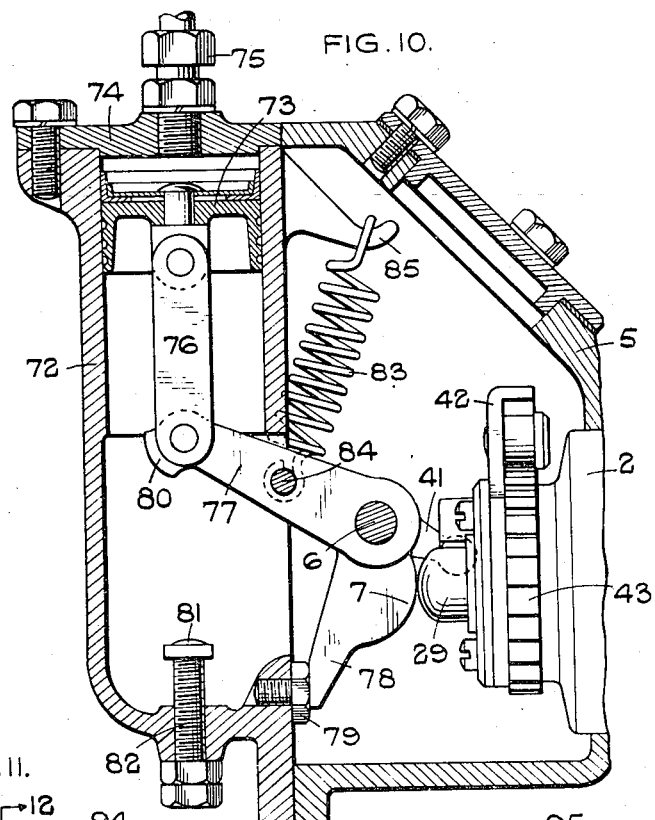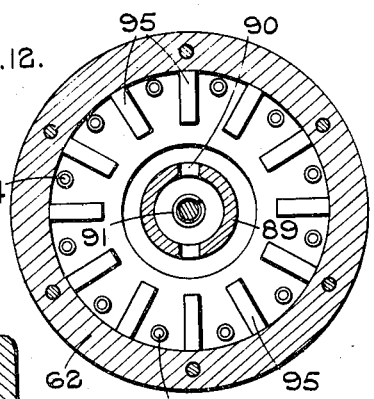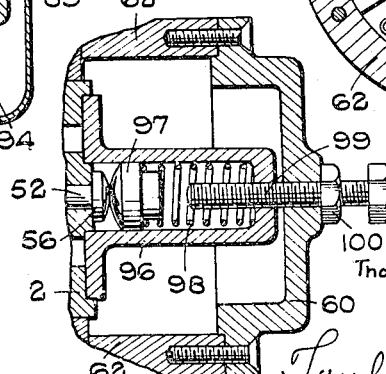

Patented May 9, 1939

2,157,970

UNITED STATES PATENT OFFICE 2,157,970

APPARATUS FOR DELIVERING LIQUIDS AND VISCOUS MATERIALS

Thomas Carlyle Ellison Rowland, Solihull, and Harry Parker, Birmingham, England

Application April 28, 1937, Serial No. 139,596
In Great Britain May 11, 1936

16 Claims. (Cl. 184—35)

This invention relates to apparatus for delivering liquids and viscous materials (hereinafter referred to as liquids), and applies to all cases wherein liquid is to be fed under pressure from a container to a plurality of individual points.

For instance, the invention has particular reference to lubricating systems in which a pump or propelling device is employed for feeding lubricant to a number of separate points, as in the cases of chassis lubrication for motor cars, and in certain stationary machines.

Our invention relates to that kind of apparatus which includes liquid propelling means, such as a pump, supplying liquid to a rotary distributor, and means for driving the rotary distributor so that it delivers the liquid to each of a number of delivery conduits in succession, or to each of a number of groups of conduits in succession.

One of the objects of the present invention is to construct the apparatus so that the operating gear and liquid propelling means will form a self-contained unit quickly detachable from a distribution plate to which the pipe connections to take the liquid to the points where it is required, are attached, so that adjustment and repairs to the operating means and liquid propelling means can be effected without disturbing the pipe connections.

Another object of the present invention is to construct the apparatus so that the amount of liquid delivered at each stroke, or the amount of liquid delivered at some of the strokes can be adjusted as may be desired, since some of the points which require to be lubricated take more liquid than others.

A further object of the present invention is to construct the apparatus so that the amount of liquid delivered at successive strokes is not always the same.

Other objects of the present invention will appear from the following description.

According to one feature of the present invention, in apparatus of the kind referred to, we provide a plate adapted to have connected thereto the delivery pipes or conduits, and wherein the pump, distributor and drive means for said distributor are constructed as a complete or self-contained unit, the pump, distributor and drive means being independent of said plate and not individually supported or carried thereby, but the unit being readily attachable to, or detachable from, said plate without disturbing the mounting of the constituent parts of said unit.

According to another feature of the present invention, we provide means whereby the amount of liquid delivered by the pump at any selected stroke thereof or at certain pre-selected strokes thereof, can be adjusted.

Referring to the drawings:

Figure 1 is a sectional view in side elevation showing one form of the apparatus.

Figure 5 is a sectional view in side elevation showing another form of the apparatus.

Figure 5a is a fragmentary sectional view showing a modification of the construction illustrated in Figure 5.

Figure 6 is a plan view partly in section of the construction shown in Figure 5.

Figure 7 is an end view partly in section, the section being taken on line 7—7 of Figure 5.

Figure 8 is a section on line 8—8 of Figure 5.

Figure 9 is a sectional plan view showing the adjustable stop means employed in the construction shown in Figure 5.

Figure 10 is a sectional view in side elevation showing a modified form of operating means.

Figure 11 is a sectional view in side elevation showing a modified form of adjustable stop means.

Figure 12 is a section on line 12—12 of Figure 11.

Figure 13 is a sectional view in side elevation showing a further modification of the adjustable stop means.

Figure 3:
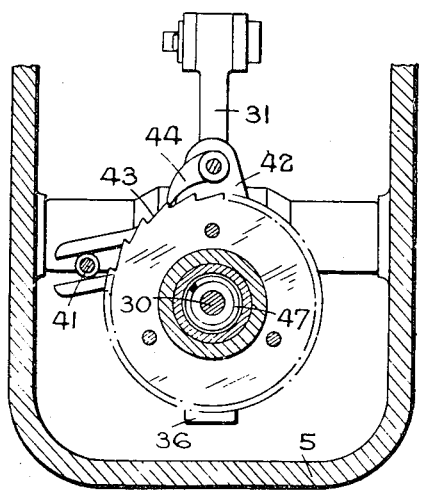
Figure 3 is a section on line 3—3 of Figure 1.
Figure 4:
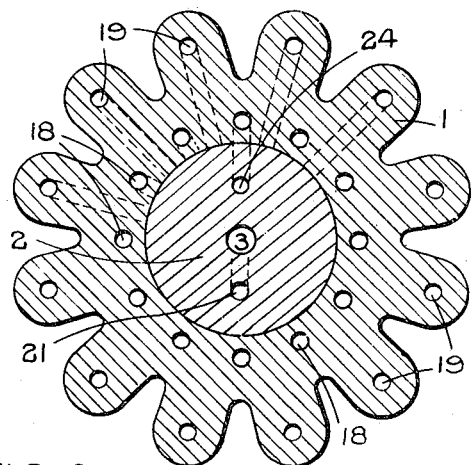
Figure 4 is a section on line 4—4 of Figure 1.
Figure 2:
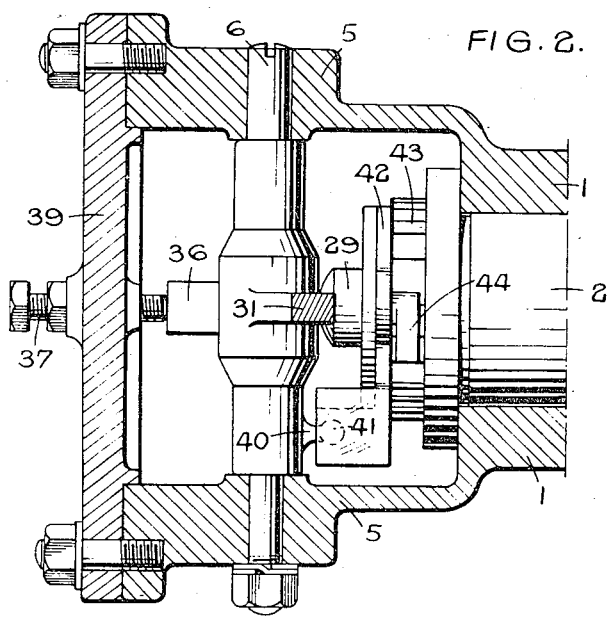
Figure 2 is a sectional plan view showing the cam and associated parts.

In the construction illustrated in Figures 1 to 4, the apparatus comprises a stationary body or casing including a cylinder 1 in which is mounted the rotary distributor 2, the pump cylinder 3 being formed by an axial boring in the distributor 2.

The cylinder 1 is provided with an extension 5 which forms a housing for a cross shaft 6 carrying a cam or lever 7 (hereinafter referred to as a cam) and certain other parts, and the end of the cylinder extension 5 is closed by a cylinder 8 which contains a piston 9 forming the driving element in this particular construction. It is, however, to be understood that other forms of driving element for operating the cam and associated parts may be used.

The unit formed by the parts 1 to 9 is detachably secured to a plate 10 to which a number of pipe connections 11 are made, these pipes 11 conveying the liquid to the points which require lubrication. Each pipe connection includes a sleeve 12 containing a spring-pressed ball valve 13 which operates as a non-return valve.

Between the plate 10 and the flange 14 on the end of the cylinder 1, a liquid supply chamber 15 is formed, and the liquid is supplied to this chamber from a suitable source of supply by a pipe 16 connected at 17 to the plate 10.

The cylinder 1 is provided with two groups of delivery ports. The inner group is shown at 18, and the outer group is shown at 19. It will be seen that the inner ends of the ports of the two groups are spaced apart longitudinally along the distributor 2, while their outer ends terminate in the face 20 of the flange 14, the outer ends of all the ports 18 being situated on a circle, and the outer ends of all the ports 19 being situated on a larger circle. There is one pipe 11 corresponding with each of the ports 18 and 19.

The inlet port 21 to the pump cylinder 3 extends through the end of the distributor 2 and has a branch 22 entering the pump cylinder 3 radially.

The pump cylinder 3 is provided with a delivery port 23 which leads into the passage 24 which is parallel to the axis, and this passage 24 has two radial branches 25 and 26 which co-operate respectively with the inner ends of the two groups of ports 18 and 19.

The ports of the two groups 18 and 19 are staggered in relation to each other, so that at each delivery from the pump, only one out of all the ports 18 and 19 receives the liquid.

A sliding valve 27 is provided in the end of the pump cylinder 3, this valve being acted upon by a spring 28 tending to keep it in a position in which it closes the delivery port 23.

The liquid is pumped by a plunger 30 reciprocating in the pump cylinder 3. The plunger 30 is shown in Figure 1 at the left hand end of its stroke, and the cylinder 3 is full of the liquid to be pumped. As the plunger moves to the right, it first closes the passage 22, after which a definite volume of the liquid is imprisoned between the end of the plunger 30 and the left hand end of the valve 27. As the plunger 30 moves to the right, since the liquid is incompressible, the valve 27 is also moved to the right, thus uncovering the delivery port 23. The imprisoned liquid is thus forced through the delivery port 23. On the return movement of the plunger 30, the valve 27 moves to the left, thus closing the delivery port 23, and continued movement of the plunger 30 to the left creates a vacuum in the cylinder 3 until the port 22 is uncovered, when the cylinder becomes filled with liquid again.

Mounted on the shaft 6 is the cam 7, and this cam is oscillated by means of a lever 31 receiving motion from a link 32 connected to the piston 9 operating in the cylinder 8. The cylinder 8 is provided with a port 33 to which a pipe connection can be made, so that the piston can be moved to the left against the pressure of a spring 50 by means of suction from any suitable source.

In the arrangement shown, the return movement of the piston 9 is produced by the spring 50, but if desired the piston may be operated by suction or pressure in both directions. The piston and cylinder 9 and 8 may be replaced by any form of mechanical driving element for rocking the cam 7.

The cam 7 is provided with an arm 36 which engages a stop 37. An adjustable set screw 38 is also provided in the end of the cylinder 8, this adjustable set screw serving as an adjustable stop for the piston 9. The set screw 37 co-operates with the arm 36 to form a stop for movement of the cam 7 in one direction. By adjusting the set screw 38, the stroke of the plunger 30 can be altered as desired.

Associated with the cam arm 7 is an arm 40 having a ball end 41 engaging a ring 42 mounted on a ratchet wheel 43 fixed to the rotary distributor 2. The ring 42 carries a pawl 44 adapted to engage with the ratchet teeth, the arrangement being such that when the cam 7 rocks in a clockwise direction, it moves the ring 42 causing the pawl 44 to turn the ratchet wheel 43 and the rotary distributor 2 to which it is attached, thus moving the ports 25 and 26 one step equal to the angular distance from a port 18 to the next port 19 or vice versa. An adjustment of the set screw 37 enables the ports 25 and 26 to be accurately aligned with the ports in the cylinder.

The pump plunger 30 is provided with a head 45 and the end of the rotary distributor 2 is recessed as shown at 46, the recess containing a spring 47 which operates on the head 45 to produce a suction stroke of the pump.

Slidably mounted in the recess 46 is a cap 29 engaging over the head 45 and also engaging the cam 7.

The cylinder extension 5 forms a chamber or compartment containing the cam shaft, cam and associated parts, and these may operate in oil. This chamber may be provided with an opening 51 which serves to determine the oil level and which also serves as a breather to allow air to escape and enter when the piston 9 moves.

In order to enable air to be exhausted from the chamber 15, a passage or port may be provided either through the plate 10 or through the flange 14 of the cylinder, the said passage normally being closed by a screwed plug.

It will be seen that the body or casing and the pump, distributor and drive means mounted in such body or casing are formed as a self-contained unit, and the pump, distributor and drive means are independent of the plate 10 and not individually supported thereon, so that the whole of the unit including all the working parts can be readily detached from the plate 10 without disturbing any of the pipe connections and without disturbing the mounting of any of the working parts mounted in the body or casing.

In operation the port 33 is placed into communication with a suitable source of suction which periodically moves the piston 9 so as to rock the cam 7, causing the pump 30 to be operated alternately to draw liquid into the pump cylinder and force it out again through its delivery port. During the delivery stroke of the pump, the rotary distributor 2 is stationary, but on the return stroke it is turned by a definite amount to bring one of its delivery ports 25 or 26 into register with a fresh cylinder port.

In the apparatus hereinbefore described with reference to Figures 1 to 4, the volume of liquid delivered at each delivery stroke of the pump is constant. In practice it is found that the volume of liquid or material required for lubricating different parts of a stroke (assuming that the liquid is lubricant) varies, and in Figures 5 to 13 we have shown some constructions in which means are provided whereby the volume of liquid delivered by the pump in successive strokes can be adjusted.

In the construction shown in Figures 5 to 9, the general arrangement of parts is the same as that shown in Figures 1 to 4, and corresponding parts bear the same reference numerals.

In the construction shown in Figures 5 to 9, however, the valve 27 is replaced by a sliding valve 52 in the form of a piston operating in the cylinder 3 and adapted to cover the discharge port 23 on the intake stroke of the pump 30 and to uncover it on the discharge stroke of the pump. In the arrangement shown in Figures 5 to 9, we provide an adjustable stop device to control the movement of the discharge valve 52 on the delivery stroke.

In the arrangement described with reference to Figures 1 to 4, on the discharge stroke the piston 30 of the pump and the discharge valve 27 moved in the same direction and at the same speed until the discharge port 23 was uncovered. Up to this point there was no delivery of the liquid, but at this point the discharge valve 27 was engaged by a stop, so that further movement of the pump piston 30 resulted in some of the liquid between the pump piston and the discharge valve 27 being forced out through the port 23.

In the arrangement shown in Figures 5 to 9, the motion of the discharge valve 52 can be arrested at any desired point. Instead of stopping the discharge valve 52 as soon as the discharge port is uncovered, in the arrangement shown in Figures 5 to 9 we may permit the discharge valve 52 to continue its travel until the end of the discharge stroke, in which case there will be no delivery of liquid. The motion of the discharge valve 52 may be arrested at any desired point after the inner end of the discharge valve has uncovered the discharge port 23.

To enable this to be done, we provide an adjustable stop which, in Figures 5 to 9, takes the form of a slide 53 slidably mounted upon a hollow guide 54 attached to the end of the distributor. This stop 53 has a part 55 which extends through slots 101 in the guide 54 and engages a head 56 formed at the outer end of the discharge valve 52. A spring 57 is provided between the adjustable stop 55 and the end of the sleeve 54, so that normally the adjustable stop is pressed inwardly towards the discharge valve 52. On the discharge stroke of the pump piston 30, the spring 57 is compressed, and the discharge valve 52 at the beginning of the stroke has substantially the same movement as the pump piston 30.

The slide 53 which forms part of the adjustable stop 55 is provided with an external projection 58 adapted to be engaged by the inner end of a set screw 59 secured in a plate 60.

In this construction the body 1 is provided with an extension 62 which projects through an opening in the plate 10, and the end of the extension 62 is closed by the plate 60. The plate 60 is provided with a central recessed part 63 which carries a thin cover member 64.

The set screw 59 can of course be adjusted to arrest the motion of the slide 53 at any desired point.

The distributor 2 in which the pump piston 30 is mounted, has a rotary step by step movement as described with reference to Figures 1 to 4, and the sleeve 54 carrying the adjustable stop 55 turns with the distributor 2.

Thus instead of providing a single set screw 59 in the plate 60, we provide as many set screws as may be desired, one for each step in the movement. In the drawings all these set screws bear the reference numeral 59.

In the construction shown in Figure 5ª, the set screws 59 are replaced by a plate 102 upon which are formed a number of ribs 103 one for each step in the rotary movement of the distributor. The ribs 103 project from the surface of the plate 102 by various distances in accordance with the amount of discharge required at the different steps. The plate 102 in the construction shown in Figure 5ª is secured to the plate 60 by means of screws. The ribs 103, however, may be formed upon the inner surface of the plate 60 instead of using a separate plate 102.

As compared with the construction shown in Figures 1 to 4, that shown in Figures 5 to 9 also incorporates the following modifications.

The rotary distributor 2 instead of engaging the cylinder 1 directly, engages a renewable sleeve 65 which is attached to the cylinder 1.

Instead of bringing the inlet 16, 17 through the plate 10, the inlet 66 is brought in through the side of the cylinder 1, the sleeve 65 being provided with a port 67, and the rotary distributor 2 being provided with an annular port 68, which communicates with an axially disposed port 69 connected to the pump cylinder 3 by the port 22.

Instead of placing the non-return valves 13 in the plate 10, non-return valves 70 are mounted in the ports 18 and 19.

Instead of providing the opening 33 to the cylinder 8 containing the piston 9 at the lower side of the cylinder, it is provided at the upper part as shown at 71.

In the construction shown in Figure 10, an arrangement is shown in which the apparatus is operated by pressure instead of suction, and in this case to the end of the cylinder extension 5 is secured a pressure cylinder 72, the axis of which is vertical. The cylinder 72 contains a piston 73, and the upper end is closed by a cover 74 to which a pressure connection 75 is made. The piston 73 is connected by a link 76 to a lever 77 mounted on the shaft 6, this lever having a cam surface 78 which operates the cap 29.

The cam arm 78 is adapted to come into contact with a stop 79 which limits the motion in one direction, and the lever 77 is provided with a projection 80 adapted to engage the end 81 of an adjustable screw 82 which limits the motion in the other direction.

A spring 83 is provided attached to a pin 84 on the lever arm 77, the opposite end of the spring engaging a lug 85 on the cylinder 72, and this spring provides for the return movement.

In the modification shown in Figures 11 and 12, we use the lever 86 pivoted at 87 to a lug 88 on a hollow guide 89 fixed to the end of the distributor 2. This lever 86 forms the adjustable stop for the discharge valve 52. The lever extends through a slot 90 in the guide 89, and a spring 91 acting through a washer 92 serves to return the discharge valve 52 on the suction stroke.

The end 93 of the lever 86 is adapted to come into contact with the ends of screws 94 which are the equivalents of the screws 59. In this construction the terminal position of the lever 86 is determined at alternate strokes by the adjustable screws 94. On the other strokes it is determined by ribs 95 formed on the inside of the plate 63, or by ribs formed on a separate plate attached to the inner surface of the plate 63. The ribs 95 may be of varying thicknesses, so as to give a variation in the amount of discharge at different positions.

The construction shown in Figure 13 provides an arrangement whereby the discharge at all the strokes of the pump is uniform, but can be adjusted when required. In this arrangement the end of the distributor is provided with a hollow guide 96 in which is slidably mounted a washer 97 acted upon by a spring 98. The movement of the washer 97 along the guide 96 is limited by an adjustable screw 99. The screw can be locked by a lock nut 100. The spring 98 provides for the return movement of the discharge valve 52.

One of the advantages of the apparatus constructed in accordance with the present invention is that it is self-priming, i. e., assuming that the various ports and passages in the apparatus contain air at starting, this air is quickly expelled by operating the apparatus. Any air in the inlet passage finds its way to the space between the plunger 30 and the discharge valve 27 or 52, and is compressed when the plunger 30 makes its delivery stroke until the discharge port 23 is uncovered, when such air is forced out through the discharge passage. In effect the apparatus operates as an efficient air pump until all the air has been excluded.

What we claim then is:

1. Apparatus for delivering liquids, comprising a pump, a distributor, operating means for the pump, driving means for the distributor, and a casing containing the distributor, all associated together as a self-contained unit, and a plate having delivery openings therethrough, and a delivery pipe union on the plate connecting with each of said openings, said self-contained unit being detachably associated with said plate and being removable from said plate without disturbing the relative dispositions of the parts constituting said unit, said parts being retained in position in said unit independently of said plate.

2. Apparatus for delivering liquids, comprising a pump, a distributor, said pump being disposed axially within the distributor, and including a reciprocating plunger, driving means for the distributor, a casing containing the distributor, an extension on said casing, a transverse shaft supported in said extension, and an oscillating lever on said shaft driving said plunger, all of said parts being associated together as a self-contained unit, a plate having delivery openings therethrough, a plurality of delivery pipe unions on the plate connecting one with each of said openings, and said self-contained unit being detachably associated with said plate and being removable from said plate without disturbing the relative dispositions of the parts constituting said unit, said parts being retained in position in said unit independently of said plate.

3. Apparatus for delivering liquids, comprising a pump, a distributor, said pump being disposed axially within the distributor, and including a reciprocating plunger, driving means for the distributor, a casing containing the distributor, an extension on said casing, a transverse shaft supported in said extension, an oscillating lever on said shaft driving said plunger, a cylinder mounted on said extension, a piston in said cylinder, and a mechanical connection between said piston and said lever, all of said parts being associated together as a self-contained unit, a plate having delivery openings therethrough, a plurality of delivery pipe unions on the plate connecting one with each of said openings, and said self-contained unit being detachably associated with said plate and being removable from said plate without disturbing the relative dispositions of the parts constituting said unit, said parts being retained in position in said unit independently of said plate.

4. Apparatus for delivering liquids, comprising a pump, a distributor, said pump being disposed axially within the distributor, and including a reciprocating plunger, a casing containing the distributor, an extension on said casing, a transverse shaft supported in said extension, an oscillating lever on said shaft driving said plunger, and means associated with said lever for imparting a step by step rotary movement to the distributor, all of said parts being associated together as a self-contained unit, a plate having delivery openings therethrough, a plurality of delivery pipe unions on the plate connecting one with each of said openings, and said self-contained unit being detachably associated with said plate and being removable from said plate without disturbing the relative dispositions of the parts constituting said unit, said parts being retained in position in said unit independently of said plate.

5. Apparatus for delivering liquids, comprising a pump, a distributor, said pump being disposed axially within the distributor, and including a reciprocating plunger, a casing containing the distributor, an extension on said casing, a transverse shaft supported in said extension, an oscillating lever on said shaft driving said plunger, means associated with said lever for imparting a step by step rotary movement to the distributor, and a stop for limiting the movement of the lever in one direction for the purpose of ensuring that a delivery port in the rotary distributor is aligned with a delivery port in the casing at the end of each step of the rotary movement, all of said parts being associated together as a self-contained unit, a plate having delivery openings therethrough, a plurality of delivery pipe unions on the plate connecting one with each of said openings, and said self-contained unit being detachably associated with said plate and being removable from said plate without disturbing the relative dispositions of the parts constituting said unit, said parts being retained in position in said unit independently of said plate.

6. Apparatus for delivering liquids, comprising a pump, a distributor, operating means for the pump, driving means for the distributor, a casing containing the distributor, a valve past which liquid is delivered by said pump at each delivery stroke, a spring loaded member adapted to be displaced against the action of its spring when said valve moves to permit passage of liquid, and a stop adapted to limit the amount of displacement of said member, the travel of said valve allowed by said stop determining the quantity of liquid to be delivered per stroke of said pump.

7. Apparatus for delivering liquids, comprising a pump, a rotary distributor, operating means for the pump, driving means for the distributor, a casing containing the distributor, a valve past which liquid is delivered at each delivery stroke of said pump, a spring loaded member adapted to be displaced against the action of its spring when said valve moves to permit passage of liquid, said member rotating with said distributor, and a plurality of stops adapted to co-operate with said member at successive angular positions of said distributor, some or all of said stops being adjustable so as to allow a different travel of said member, and hence to cause a different quantity of liquid to be delivered by said pump at some strokes than at others.

8. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a spring loaded member adapted to be displaced against the action of its spring when said valve moves to uncover said delivery port, and means for limiting the displacement of said member under these conditions, said means being adjustable to allow the permissible travel of said delivery valve on the delivery stroke to be varied.

9. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a guide on the end of the distributor, a slide on said guide, a spring acting on said slide and forcing it towards the end of the delivery valve, and means associated with the casing for arresting the endwise movement of said slide at each of its outward strokes.

10. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a guide on the end of the distributor, a slide on said guide, a spring acting on said slide and forcing it towards the end of the delivery valve, and adjustable set screws associated with the casing and forming stops for said slide in its various positions as it rotates with the distributor.

11. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a guide on the end of the distributor, a slide on said guide, a spring acting on said slide and forcing it towards the end of the delivery valve, the casing having a plurality of delivery ports, the inner ends of which are spaced around the distributor, a plate attached to said casing, said plate having delivery ports registering with the outer ends of the delivery ports in the casing, a tubular extension on said casing projecting through a central hole in said plate and forming a housing for said guide and slide, and a cover on the end of said tubular extension, said cover carrying stop means for said guide.

12. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a hollow guide on the end of the distributor, said guide having slots in its sides, a slide on said guide, said slide having a part projecting inwardly through said slots, a spring acting on said slide and forcing it towards the end of the delivery valve, and means associated with the casing for arresting the endwise movement of said slide at each of its outward strokes.

13. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a hollow guide on the end of the distributor, said guide having slots in its sides, a lever on said guide and extending through said slots, a spring acting on said lever, and means associated with the casing for arresting movement of said lever caused by said delivery valve.

14. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a hollow guide on the end of the distributor, said delivery valve projecting into said guide, said guide containing a spring pressed washer, and an adjustable member forming a stop for said washer.

15. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a guide on the end of the distributor, a member associated with said guide movable towards and away from the end of the delivery valve, a spring acting to press said member towards the end of the delivery valve, and means associated with the casing for arresting the endwise movement of said slide at each of its outward strokes.

16. Apparatus including a pump, a distributor, operating means for the pump, driving means for the distributor, a casing containing the distributor, said pump comprising a cylinder having inlet and delivery ports in its side, said ports being spaced apart axially, a plunger reciprocating in said cylinder and uncovering said inlet port on the suction stroke, a delivery valve formed as a plunger reciprocable in said cylinder, and adapted to uncover the delivery port on the delivery stroke, a guide on the end of the distributor, a member associated with said guide movable towards and away from the end of the delivery valve, a spring acting to press said member towards the end of the delivery valve, and projections associated with the casing for arresting the member movably associated with the guide at its outward strokes.

THOMAS CARLYLE ELLISON ROWLAND.
HARRY PARKER.